United States Patent [19]

Kovacs

[11] Patent Number: 5,373,313
[45] Date of Patent: Dec. 13, 1994

[54] COLOR XEROGRAPHIC PRINTING SYSTEM WITH MULTIPLE WAVELENGTH, SINGLE OPTICAL SYSTEM ROS AND MULTIPLE LAYER PHOTORECEPTOR

[75] Inventor: Gregory J. Kovacs, Sunnyvale, Calif.
[73] Assignee: Xerox Corporation, Stamford, Conn.
[21] Appl. No.: 987,885
[22] Filed: Dec. 9, 1992
[51] Int. Cl.5 .................... G03G 15/01; G01D 15/14
[52] U.S. Cl. .................................... 346/157; 346/160
[58] Field of Search ............... 346/157, 160, 108; 355/211

[56] References Cited

U.S. PATENT DOCUMENTS

| | | |
|---|---|---|
| 4,445,126 | 4/1984 | Tsukada . |
| 4,728,983 | 3/1988 | Zwadlo et al. . |
| 4,839,692 | 6/1989 | Shoji et al. .................... 355/211 |
| 4,977,417 | 12/1990 | Takanashi et al. . |
| 5,006,868 | 4/1991 | Kinoshita ....................... 346/157 |
| 5,089,908 | 2/1992 | Jodoin et al. .................. 346/108 X |

Primary Examiner—George H. Miller, Jr.
Attorney, Agent, or Firm—William Propp

[57] ABSTRACT

A single pass color xerographic printing system with a single polygon, single optical system Raster Output Scanning (ROS) system has a multiple wavelength laser diode source for the ROS which images the multiple beams at a single station as closely spaced spots on a multiple layer photoreceptor with each photoreceptor layer sensitive to or accessible to only one of the multiple wavelengths.

12 Claims, 7 Drawing Sheets

COLOR XEROGRAPHIC PRINTING SYSTEM WITH MULTIPLE WAVELENGTH, SINGLE OPTICAL SYSTEM ROS AND MULTIPLE LAYER PHOTORECEPTOR

CROSS-REFERENCE TO RELATED APPLICATIONS

This application contains subject matter that is related to subject matter of patent application Ser. No. 07/987,886, filed Dec. 9, 1992, and patent application Ser. No. 08/000,349, filed Jan. 4,1993, both assigned to the same assignee herein.

BACKGROUND OF THE INVENTION

This invention relates to a single pass color xerographic printing system with a single polygon, single optical system Raster Output Scanning (ROS) system, and, more particularly, to a multiple wavelength laser diode source for the ROS which images the multiple beams at a single station as closely spaced spots on a multiple layer photoreceptor with each photoreceptor layer sensitive to only one of the multiple wavelengths or only accessed by one of the multiple wavelengths.

In xerographic printing (also called electrophotographic printing), a latent image is formed on a charged photoreceptor, usually by raster sweeping a modulated laser beam across the photoreceptor. The latent image is then used to create a permanent image by transferring and fusing toner that was electrostatically attracted to the latent image, onto a recording medium, usually plain paper. While other methods are known, the most common method of sweeping the laser beam is to deflect it from a rotating mirror. A multifaceted, rotating polygon mirror having a set of related optics can sweep the beam or sweep several beams simultaneously. Rotating polygon mirrors and their related optics are so common that they are generically referred to as ROSs (Raster Output Scanners), while printers that sweep several beams simultaneously are referred to as multispot printers.

When a xerographic printer prints in two or more colors, it requires a separate latent image for each color printed, called a system color. Color prints are currently produced by sequentially transferring overlapped images of each system color onto an intermediate transfer belt that is passed multiple times, once for each system color, over the photoreceptor. The built-up image is then transferred to a single recording medium. Such printers are called multiple pass printers.

Conceptually, one can build up multiple colors on a photoreceptor or intermediate transfer belt that is passed through the system only once, in a single pass, by using a sequence of multiple xerographic stations, one for each system color. The built-up image on the photoreceptor or ITB can be transferred to a recording medium and fused in a single pass. Additionally, tandem xerographic stations can sequentially transfer images directly to the recording medium in a single pass. Such a printer, called a multistation printer, would have a greater output than a multipass printer operating at the same raster sweep speed because the rasters for each color are operating simultaneously in the single pass printer. However, the introduction of multistation printers has been delayed by 1) cost problems, at least partially related to the cost of multiple xerographic stations and the associated ROSs, and 2) image quality problems, at least partially related to the difficulty of producing similar spots at each imaging station and subsequently registering (overlapping) the latent images on the photoreceptor or transfer/recording medium.

In the practice of conventional bi-level xerography, it is the general procedure to form electrostatic latent images on a xerographic surface by first uniformly charging a charge retentive surface such as a photoreceptor. The charged area is selectively dissipated in accordance with a pattern of activating radiation corresponding to desired images. The selective dissipation of the charge leaves a latent charge pattern on the imaging surface corresponding to the areas not exposed by radiation.

This charge pattern is made visible by developing it with toner by passing the photoreceptor past a single developer housing. The toner is generally a colored powder which adheres to the charge pattern by electrostatic attraction. The developed image is then fixed to the imaging surface or is transferred to a receiving substrate such as plain paper to which it is fixed by suitable fusing techniques.

Modern business and computer needs often make it advantageous and desirable to reproduce or print originals which contain two or more colors. It is sometimes important that the copy reproduced or printed also contain two colors.

Several useful methods are known for making copies having plural colors. Some of these methods make high quality images, however, there is need for improvements. In particular, it is desirable to be able to print images having two or more highlight colors rather than being limited to a single highlight color. It is also desirable to be able to produce such images in a single pass of the photoreceptor or other charge retentive surface past the printing process areas or stations.

One method of producing images in plural (i.e. two colors, black and one highlight color) is disclosed in U.S. Pat. No. 3,013,890 to W. E. Bixby in which a charge pattern of either a positive or negative polarity is developed by a single, two-colored developer. The developer comprises a single carrier which supports both triboelectrically relatively positive and relatively negative toner. The positive toner is a first color and the negative toner is of a second color. The method develops positively charged image areas with the negative toner and develops negatively charged image areas with the positive toner. A two-color image occurs only when the charge pattern includes both positive and negative polarities.

Plural color development of charge patterns can be created by the method disclosed by F. A. Schwertz in U.S. Pat. No. 3,045,644. Charge patterns are developed of both a positive and negative polarity. The development system is a set of magnetic brushes, one of which applies relatively positive toner of a first color to the negatively charged areas of the charge pattern and the other of which applies relatively negative toner to the positively charged areas.

U.S. Pat. No. 3,816,115 to R. W. Gundlach and L. F. Bean discloses a method for forming a charge pattern having charged areas of a higher and lower strength of the same polarity. The charge pattern is produced by repetitively charging and imagewise exposing an overcoated xerographic plate to form a composite charge pattern.

As disclosed in U.S. Pat. No. 4,403,848, a multi-color printer uses an additive color process to provide either partial or full color copies. Multiple scanning beams, each modulated in accordance with distinct color image signals, are scanned across the printer's photoreceptor at relatively widely separated points, there being buffer means provided to control timing of the different color image signals to assure registration of the color images with one another. Each color image is developed prior to scanning of the photoreceptor by the next succeeding beam. Following developing of the last color image, the composite color image is transferred to a copy sheet. In an alternate embodiment, an input section for scanning color originals is provided. The color image signals output by the input section may then be used by the printing section to make full color copies of the original.

Proposed prior art multistation printers have usually included individual ROSs (each comprised of separate polygon mirrors, lenses, and related optical components) for each station. For example, U.S. Pat. Nos. 4,847,642 and 4,903,067 to Murayama et al. involve such systems. Problems with these systems include the high cost of producing nearly identical multiple ROSs and the difficulty of registering the system colors.

A partial solution to the problems of multistation xerographic systems with individual ROSs is disclosed in U.S. Pat. No. 4,591,903 to Kawamura et al. The '903 patent, particularly with regards to FIG. 6, discusses a recording apparatus (printer) having multiple recording stations and multiple lens systems, but only one polygon mirror. With only one polygon mirror and associated drive motor, the cost of the system is reduced. However, differences in the lenses and mirror surfaces still could cause problems with color registration.

Another approach to overcoming the problems of multistation printers having individual ROSs is disclosed in U.S. Pat. No. 4,962,312 to Matuura et al. The '312 patent illustrates spatially overlapping a plurality of beams using an optical beam combiner, deflecting the overlapped beams using a single polygon mirror, separating the deflected beams using an optical filter (and polarizers or additional filters if more than two beams are used), and directing the separated beams onto associated photoreceptors. The advantage of overlapping the laser beams is a significant cost reduction since the ROS is shared.

However, an actual embodiment of the '312 apparatus would be rather complicated and expensive, especially if four system colors are to be printed. The use of optical beam combiners to overlap beams so that they have similar optical axes would be difficult, expensive, and time consuming. Obtaining similar sized spots on each photoreceptor would also be difficult as it would be difficult to establish the same optical path lengths for each beam. Finally, it would also be difficult to ensure that the latent images on the photoreceptors are registered. Each of these problems is at least partially related to the relative positions of the laser sources.

In U.S. Pat. No. 5,243,359, commonly assigned with the present application and herein incorporated by reference, the multiwavelength closely spaced diode laser sources of the ROS of the color printing system are passed through a common optical system including polygon and then separated by filters to address multiple xerographic stations simultaneously.

This concept enables savings in both space and cost in color applications since several optical systems are combined into one, for example in a four color system a single polygon ROS would be used instead of four.

While this multiple wavelength single polygon ROS systems offers significant cost and space saving advantages, a number of remaining limitations beckon for a solution. Due to the focussing requirement of keeping the same pathlength for each wavelength beam, the split beam system imposes a number of geometrical limitations. After splitting a bundle of four beams (for a full color application), the different scanning beams are most conveniently focused along four scan lines all in a common plane. Therefore such a system is compatible with a tandem drum architecture. To be used with multiple xerographic stations on a single photoreceptor only a belt architecture appears practical. It would be difficult to maintain equal pathlengths when imaging the four split beams at different positions around the periphery of a drum. The necessity to use a tandem engine or belt architecture with the split beam system restricts the compactness of the machine footprint which can be achieved.

In addition while the multiple wavelength single polygon ROS with split beams eliminates the need for multiple polygons and associated optical elements it introduces the need for beam splitting elements and additional folding mirrors. These components add cost and complexity.

The registration problems associated with color xerographic printing are addressed by the multiple wavelength single polygon with split beams from the point of view of scanning bow and wobble errors. The use of a single polygon and associated optical system should minimize relative scanning bow and wobble errors at the separate imaging stations. However registration problems associated with relative image placement errors and with image transfer positioning errors are not addressed by this system.

This concept of a multiwavelength single polygon ROS addresses the general need for compact color printing systems to take advantage of the exploding color printing market. However there is still a strong need to reduce the size and complexity of color printing systems even further. There is also a need to improve the registration errors inherent in xerographic color printing systems which use tandem drums, intermediate transfer belts and multiple passes.

It is an object of this invention to provide a multiple wavelength, single ROS, single imaging station on single photoreceptor, single pass, full color, high speed printing system.

It is another object of this invention to provide a multiple wavelength laser beam source for a single polygon, single optics, ROS for use in a single pass color xerographic unit.

It is still another object of this invention to provide a multiple wavelength sensitive, multiple layer photoreceptor for use with a single polygon, single optics, ROS in a single pass color xerographic unit.

It is yet another object of this invention to provide a multiple wavelength xerographic printing system without the need for beam splitters or beam separation.

SUMMARY OF THE INVENTION

In accordance with the present invention, a single pass color xerographic printing system with a single polygon, single optical system Raster Output Scanning (ROS) system has a multiple wavelength laser diode source for the ROS which images the multiple beams at a single station as closely spaced spots on a multiple layer photoreceptor with each photoreceptor layer sensitive to or accessible to only one of the multiple wavelengths. Each imaged spot on the photoreceptor is discharged to a particular level which depends on the wavelengths of light which have been used to expose the imaged spot. Each voltage level on the photoreceptor is then developed with a different toner at successive development stations by appropriate choice of toner polarity and development biasing techniques. In this way a highlight color or full color image can be made at high speed in a single pass with a compact single optical system and single photoreceptor at a single imaging station addressed by a compact diode laser light source.

Other objects and attainments together with a fuller understanding of the invention will become apparent and appreciated by referring to the following description and claims taken in conjunction with the accompanying drawings.

DESCRIPTION OF THE PREFERRED EMBODIMENT

Figure 1:
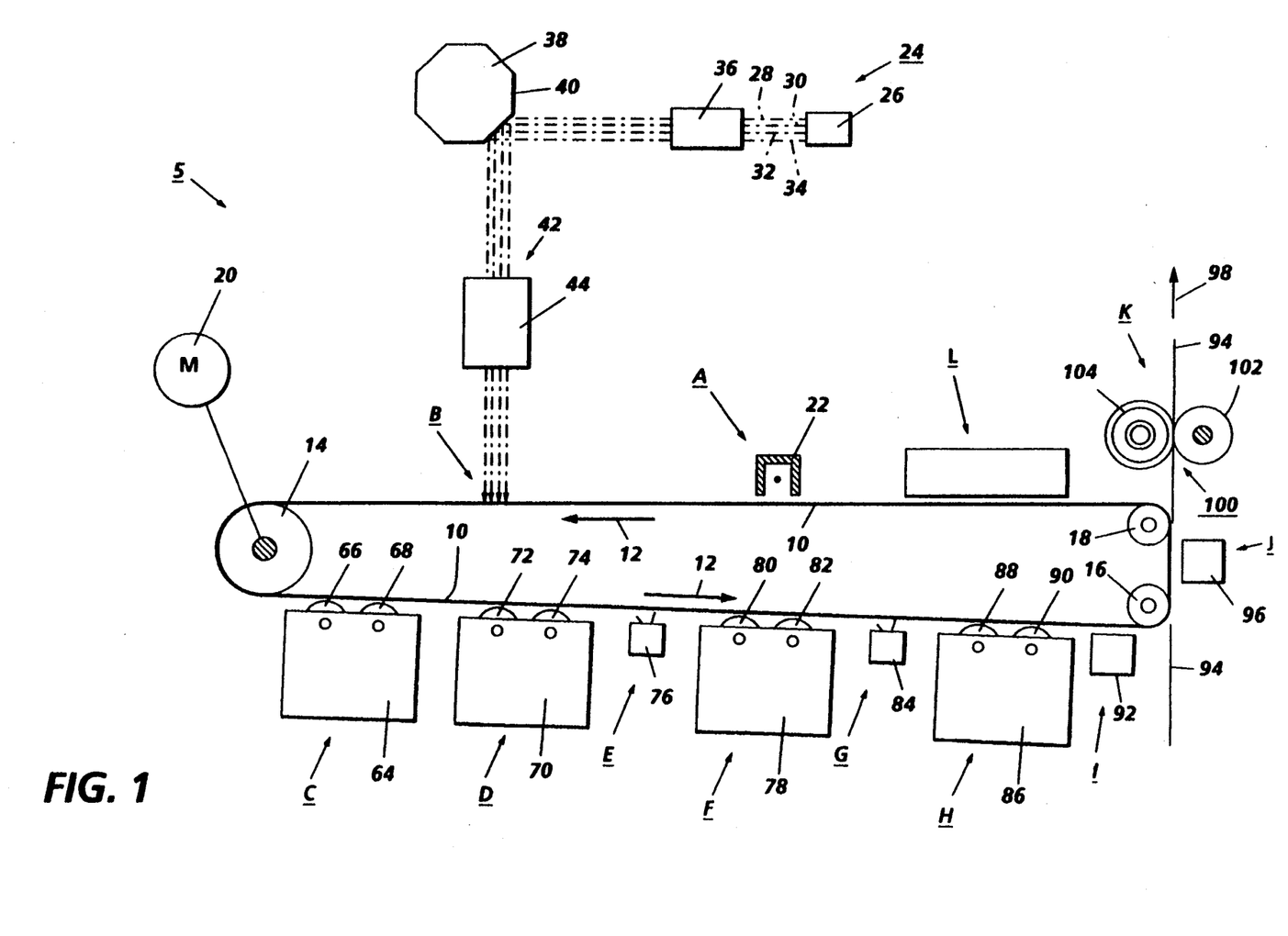
FIG. 1 is a schematic illustration of the cross-section side view of a xerographic printing system.

Reference is now made to FIG. 1, wherein there is illustrated a xerographic printing system 5 incorporating the invention which may utilize a charge retentive member in the form of a photoconductive belt 10 consisting of a photoconductive surface and an electrically conductive substrate and mounted for movement past a charging station A, an exposure station B, a first development station C, a second development station D, a first uniform exposure station E, a third development station F, a second uniform exposure station G, a fourth development station H, a pre-transfer charging station I, a transfer station J, a fusing station K and a cleaning station L. Belt 10 moves in the direction of arrow 12 to advance successive portions of the belt sequentially through the various processing stations disposed about the path of movement thereof for forming images in a single pass of the belt through all of the process stations. Belt 10 is entrained about a plurality of rollers 14, 16 and 18, the former of which can be used as a drive roller and the latter of which can be used to provide suitable tensioning of the photoreceptor belt 10. Motor 20 rotates roller 14 to advance the belt 10 in the direction of arrow 12. Roller 14 is coupled to motor 20 by suitable means such as a belt drive.

As can be seen by further reference to FIG. 1, initially successive portions of belt 10 pass through charging station A, where a corona discharge device such as a scorotron, corotron, or dicorotron, indicated generally by the reference numeral 22, charges the belt 10 to a selectively high uniform positive or negative potential, $V_O$. Any suitable control circuit, as well known in the art, may be employed for controlling the corona discharge device 22.

Next, the charged portions of the photoreceptor surface are advanced through exposure station B. At exposure station B, the uniformly charged photoreceptor or charge retentive surface 10 is exposed to a raster output scanning device 24 which causes the charge retentive surface to remain charged or to be discharged in accordance with the output from the scanning device. An electronic subsystem converts a previously stored image into the appropriate control signals for the ROS in an imagewise fashion.

The raster output scanner 24 uses a plurality of clustered laser beams of different wavelengths having substantially parallel optical axes. To reduce the problems of obtaining equal optical path lengths, to reduce the difficulty of spot registration, and to eliminate beam alignment problems, the multistation printing system of FIG. 1 generates closely spaced, multiple wavelength laser beams using either a single structure or closely adjacent structures.

Examples of such multiple wavelength devices are described in "Monolithic Multi-Wavelength Laser Diode Array", U.S. patent application Ser. No. 07/949,452, commonly assigned as the present application and herein incorporated by reference.

A quad laser semiconductor structure 26 emits four different wavelength laser beams, designated laser beams 28, 30, 32 and 34, at about 450, 540, 670, and 830 nanometers, respectively in the blue, green, red and infrared wavelengths. For purposes of clarity, only the chief rays are shown. The laser semiconductor structure 26 effectively provides a substantially common spatial origin for each beam. Each beam is independently modulated so that it exposes its associated photoreceptor layer in accordance with a respective color image. It is important that each color spot from the four laser beams be scanned over the entire photoreceptor so that any desired voltage discharge level (and resulting deposited color toner) can be achieved anywhere on the photoreceptor. In this embodiment, the four spots are aligned parallel to the scanning motion along the photoreceptor. All four spots would be scanned over a given point on the photoreceptor on each scan. The spot to spot spacings should be as small as possible to hold all beam centers as close as possible to the optical axis to minimize image distortions. After passing through the ROS and scanning optics, the spots are focussed onto the photoreceptor in a configuration similar to their configuration at the light emitting source.

Referring to the raster output scanner 24 of FIG. 1, the four laser beams from the laser structure 26 are input to a conventional beam input optical system 36 which collimates, conditions and focuses the beams onto an optical path such that they illuminate a rotating polygon mirror 38 having a plurality of facets 40. As the polygon mirror rotates, the facets cause the reflected beam to deflect repeatedly in the direction indicated by the arrow 42. The deflected laser beams are input to a single set of imaging and correction optics 44, which corrects for errors such as polygon angle error and wobble and focuses the beams onto the photoreceptor belt.

As stated earlier, at exposure station B, the uniformly charged photoreceptor or charge retentive surface 10 is exposed to a raster output scanning device 24 which causes the charge retentive surface to remain charged or to be discharged in accordance with the output from the scanning device.

Figure 2:
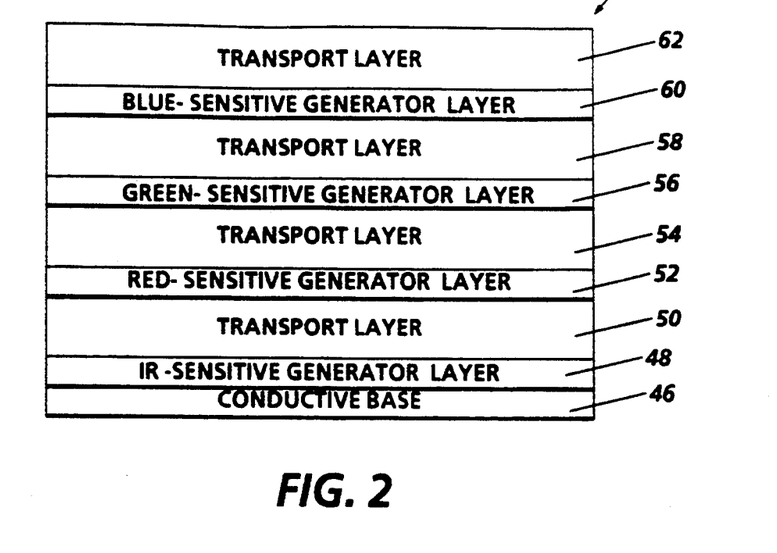
FIG. 2 is a schematic illustration of the cross-section side view of a multiple layer photoreceptor belt for the xerographic printing system of FIG. 1 formed according to the present invention.

The photoreceptor belt 10 as shown in FIG. 2 consists of a flexible electrically conductive substrate 46. The substrate has any effective thickness, typically from about 6 to about 250 microns, and preferably from about 50 to about 200 microns, although the thickness can be outside of this range. The photoreceptor layers themselves may consist of two or more sublayers. Each photoreceptor layer in FIG. 2 consists of two sublayers, i.e. a charge generator layer and a charge transport layer.

Upon the substrate 46 is a first, infrared-sensitive, generator layer 48 approximately 0.1 to 1 $\mu$m thick and a first transport layer 50 of m-TPO in polycarbonate (N,N'-diphenyl-N,N'-bis(3"-methylphenyl)-(1,1'-biphenyl)-4,4'-diamine) which is hole transporting and approximately 15 $\mu$m thick. Upon the first generator and transport layers is a second, red-sensitive, generator layer 52 approximately 0.1 to 1 $\mu$m thick, a second transport layer 54 of m-TPO in polycarbonate which is hole transporting and approximately 15 $\mu$m thick. Upon the second generator and transport layers is a third, green-sensitive, generator layer 56 approximately 0.1 to 1 $\mu$m thick, a third transport layer 58 of m-TPO in polycarbonate which is hole transporting and approximately 15 $\mu$m thick. And upon the third generator and transport layers is a fourth, blue-sensitive, generator layer 60 approximately 0.1 to 1 $\mu$m thick, and a fourth transport layer 62 of m-TPO in polycarbonate which is hole transporting and approximately 15 $\mu$m thick.

The generator and transport layers can be deposited or vacuum evaporated or solvent coated upon the substrate by means known to those of ordinary skill in the art.

Figure 3:
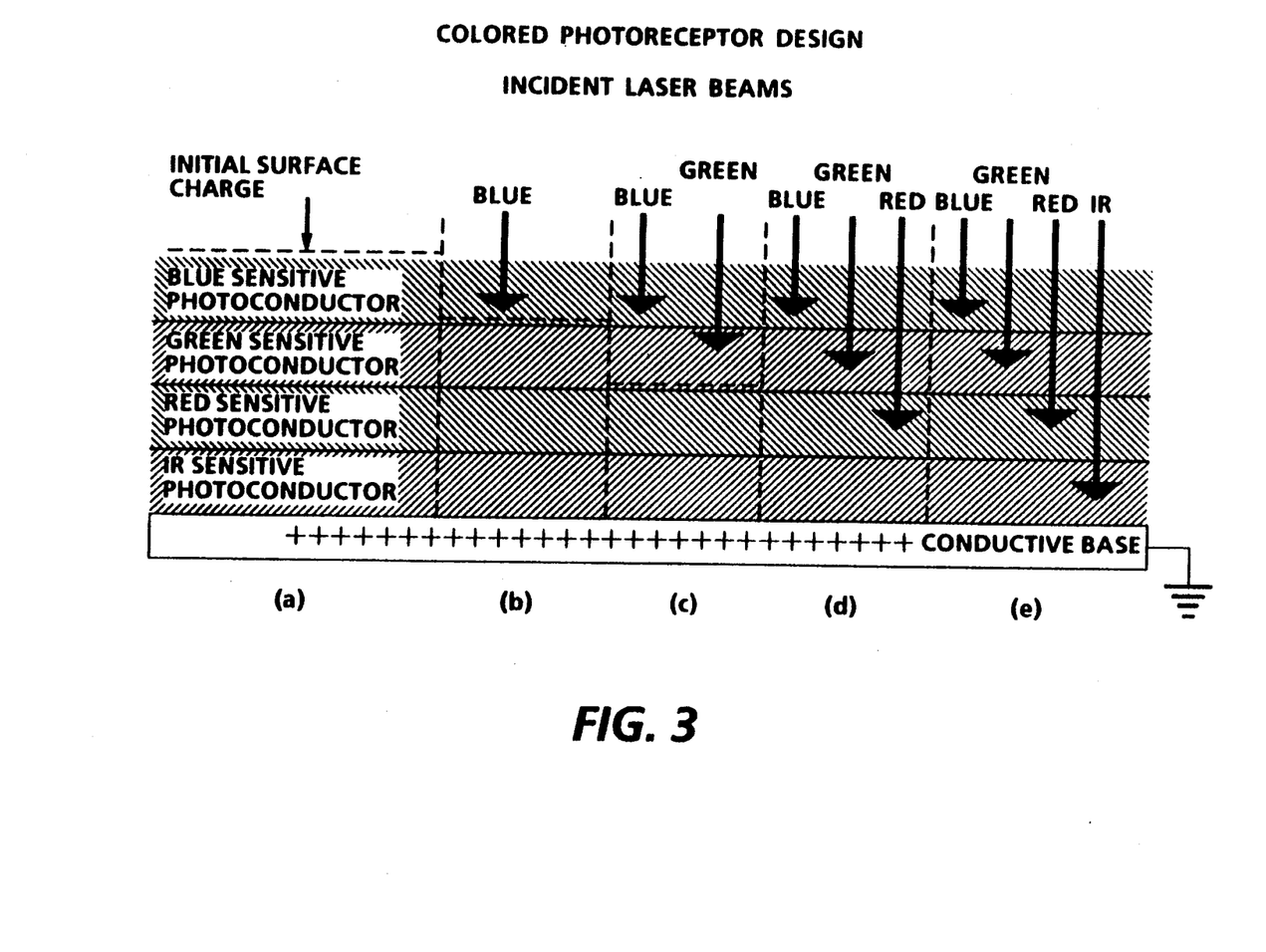
FIG. 3 is a schematic illustration of the cross-section side view of the exposure of the multiple layer photoreceptor belt for the xerographic printing system of FIG. 1 formed according to the present invention.

The details of the imaging process to expose the 4-color image in a single pass of the photoreceptor belt are shown in FIG. 3. Light of different colors will be absorbed in different layers of the photoreceptor. Therefore the red laser spot will be absorbed in the red sensitive layer, the green spot in the green sensitive layer, the blue spot in the blue sensitive layer, and the IR spot in the IR sensitive layer.

Figure 4:
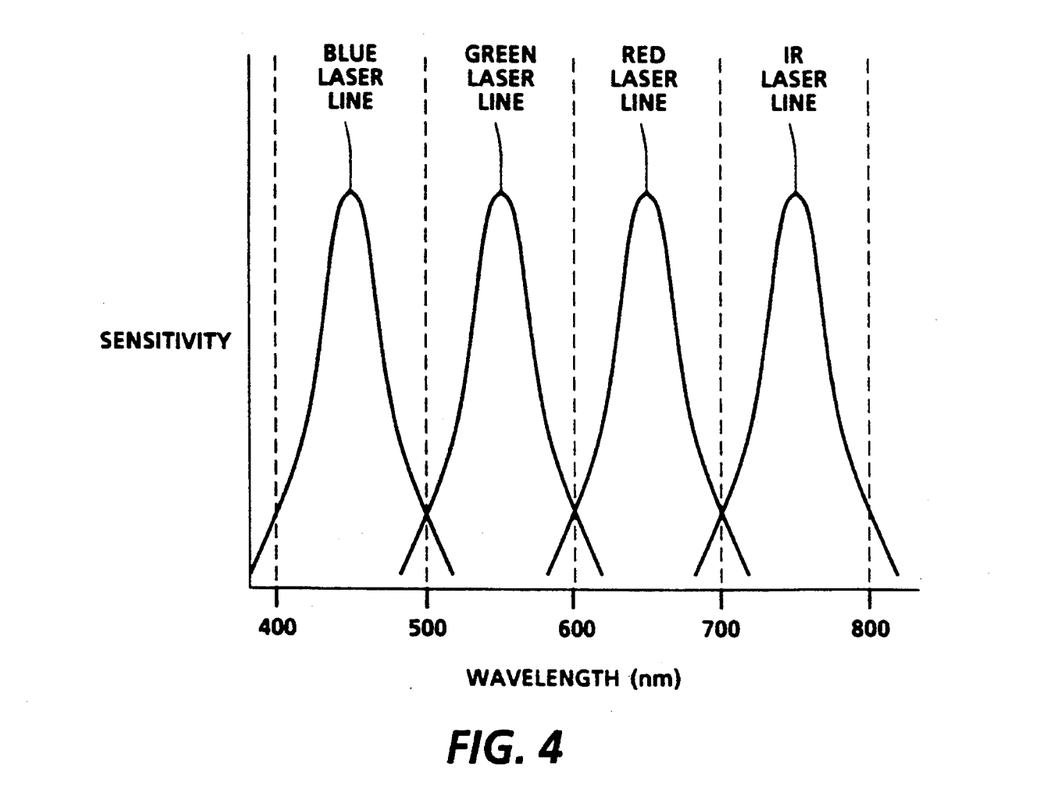
FIG. 4 is a schematic illustration of the wavelength sensitivity of a multiple layer photoreceptor belt versus the wavelength range of the multiple wavelength laser structure for the xerographic printing system of FIG. 1 formed according to the present invention.

As shown in FIG. 4, each generator layer may be sensitive to only one of the wavelengths from one of the lasers of the multiple wavelength laser source while being transparent to the other wavelengths from the other lasers of the multiple wavelength laser source. The sensitivity of each layer of the photoreceptor is separated as are the wavelengths of the light from the laser source. In order for the discharge to occur only in the required layer, the sensitivity of each of the layers must be well separated and over a narrow range of wavelengths. The blue laser line should be absorbed only by the blue sensitive photoconducting pigment and not by the green, red or IR sensitive layers. The spectral sensitivity of the photoconducting layers should match the output of the laser light sources as closely as possible. Ideally each of the photoconducting layers should be excited by only one of the lasers and should be transparent to the other laser lines.

The multi-layer photoreceptor is discharged to different levels depending on the color(s) of incident light as shown in FIG. 3. There are five resultant areas illustrated on the photoreceptor: (a) the unexposed areas of no layers which retain the original surface voltage, (b) the top layer exposed only to the blue light, (c) the two top layers exposed only to the blue light and the green light, (d) the three top layers exposed only to the blue light, the green light and the red light, and (e) the fully discharged areas of all four layers exposed to the blue light, the green light, the red light, and the infrared light. However, discharge to each level can in general be achieved in a plurality of ways.

Depending upon the number of colors and color combinations desired for printing, one could use a dual layer photoreceptor in combination with a dual wavelength light source, as taught in copending patent application Ser. No. 07/987,886, commonly assigned as the present application and herein incorporated by reference, a three layer photoreceptor in combination with a three wavelength light source or a four layer photoreceptor in combination with a four wavelength light source.

The dual layer photoreceptor and dual wavelength system is capable of producing 3 (SPOT) color images. The three layer photoreceptor and three wavelength system is capable of producing 4 (SPOT) color images. The four layer photoreceptor, four wavelength system is capable of producing full color process images. SPOT color is such that only a single color of toner is deposited at any one point of the image, i.e. there is no development of one color toner on top of another. In process color images, cyan, magenta, yellow and black toners are generally used with a color on color scheme wherein all three combinations of any two of the cyan, magenta and yellow colorants on top of each other are used along with the individual cyan, magenta, yellow and black colorants alone.

Figure 5A:
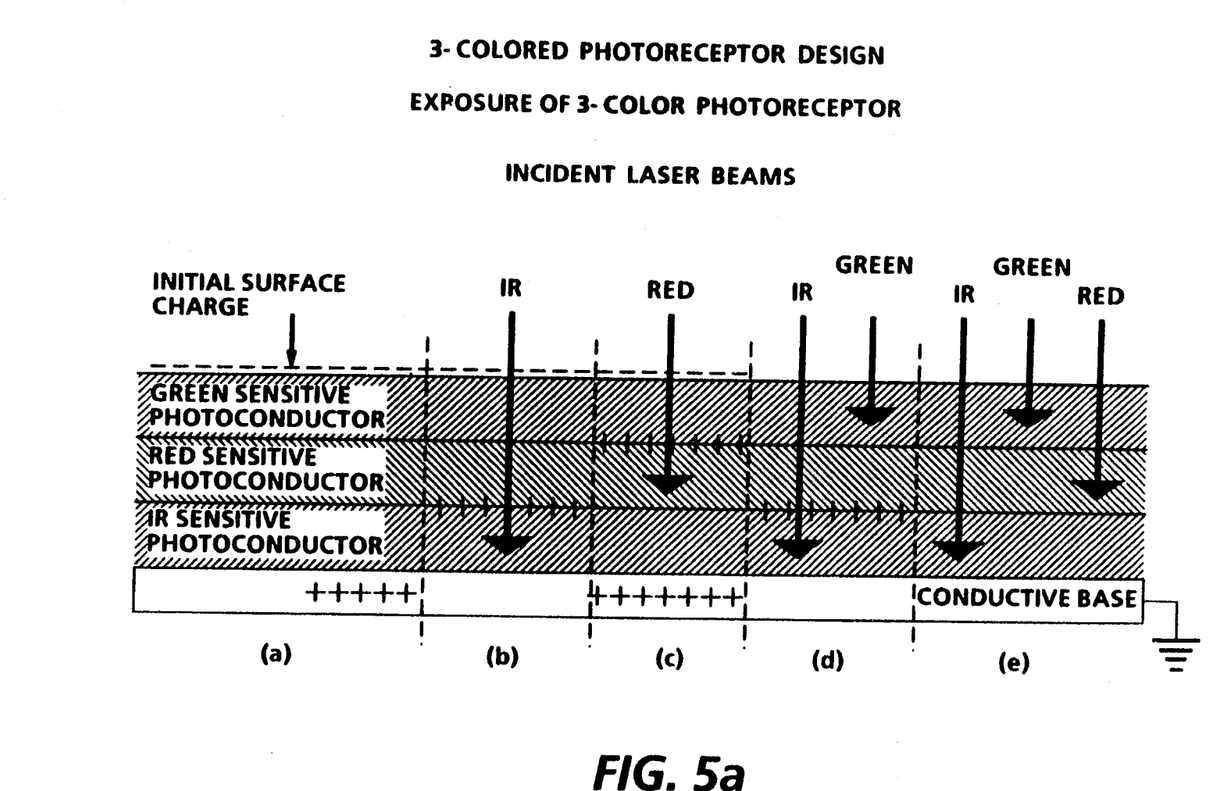
FIGS. 5a and 5b are schematic illustrations of the exposure of a multiple layer photoreceptor belt and the development of the multiple layer photoreceptor belt for the xerographic printing system of FIG. 1 formed according to the present invention.
Figure 5B:
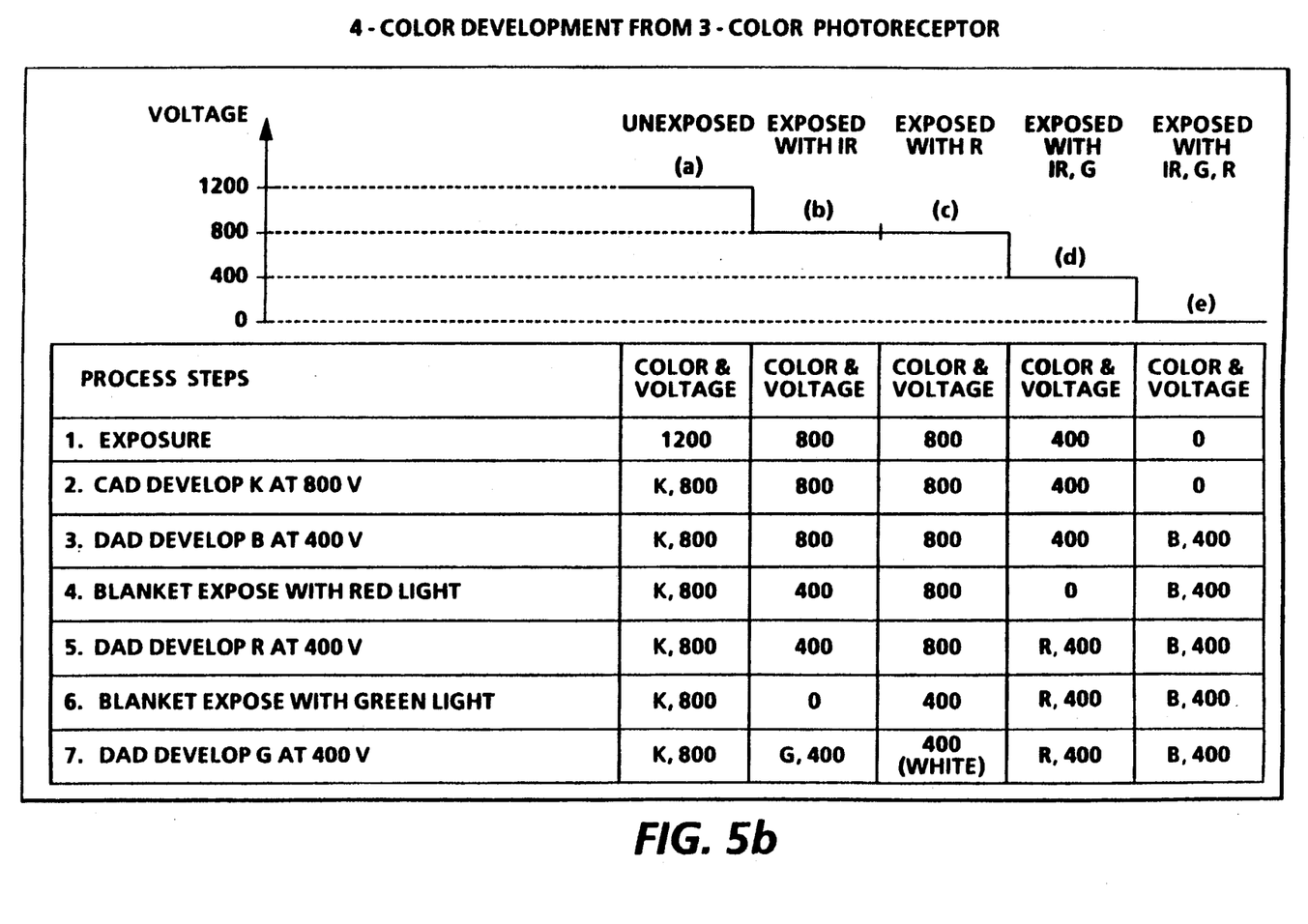

A four color development process can be done in many ways. The first embodiment is shown in FIGS. 1 and 5a and 5b. In this additive color system the primary colors, red, green, blue and black are generally used. Both polarities of toner are used and both CAD (charged area development) and DAD (discharged area development) development are used. Appropriate development biases are used at each step. Scavengeless development techniques would be used to avoid contamination of developer housings by already deposited toner of another color. For convenience it is assumed that the initial charging voltage is 1200 V on the three layer photoreceptor and that the four voltage levels are equally spaced at 400 V intervals.

In the scheme shown in FIG. 5b, two blanket or uniform exposure steps are used in order to change relative voltage levels in the electrostatic image and thereby allow five differently toned areas. These blanket exposure steps are relatively easy to perform with a simple light source such as a narrow fluorescent strip or tube, or narrow incandesdent bulb which is appropriately filtered to transmit only the IR or blue or whatever color is required. A restricted color of light from the blanket exposure is important, but beyond a certain minimum the absolute level of exposure is not. Such a narrow strip or tube is easily inserted between the developer stations.

Four SPOT color imaging can be done with a three color photoreceptor, three wavelength system. FIG. 5a shows five different exposure combinations of IR, red and green light on a three layer photoreceptor whose three layers are sensitive to IR, red and green light respectively. The five different exposure combinations will result in four different colored areas plus an uncolored white area on the final print. Area (a) is unexposed and remains at 1200 V; area (b) is exposed with IR only and discharged to 800 V; area (c) is exposed with red only and discharged to 800 V; area (c) is exposed with IR and green and discharged to 400 V; and area (e) is exposed with IR, red and green and discharged to 0 V.

The steps in the four color development process of the embodiment in FIG. 5b are: first, exposure of the photoreceptor belt to the three modulated laser beams of different wavelengths; second, CAD development of the black at 800 volts in area (a); third, DAD development of the blue at 400 volts in area (e); fourth, blanket exposure of the photoreceptor belt with red light to discharge area (b) to 400 V and area (d) to 0 V;fifth, DAD development of the red at 400 volts in area (d); sixth, blanket exposure of the photoreceptor belt with green light to discharge area (b) to 0 V and area (c) to 400 V; and seventh, DAD development of the green at 400 volts in area (b).

After biasing at 800 V and toning with black toner in step 2, the surface potential in the area (a) initially at 1200 V is reduced to 800 V since the primary development mechanism is charge neuralization. After biasing at 400 V and DAD toning with blue toner in step 3, the surface potential in area (e) initially at 0 V is raised to 400 V. The blanket exposure in step 4 reduces the surface potential in area (b) from 800 V to 400 V and in area (d) from 400 V to 0 V since these areas have not yet been exposed with red light. The surface potential in area (c) remains unchanged at 800 V since this area has already been exposed with red light. The black toner in area (a) and blue toner in area (e) both block the red light exposure and prevent surface potential discharge in these areas. After biasing at 400 V and DAD toning with red toner in step 5, the surface potential in area (d) initially at 0 V is raised to 400 V. The blanket exposure with green light in step 6 drops the surface voltage in area (b) from 400 V to 0 V and in area (c) from 800 V to 0 V since neither of these areas have seen green light. In the other areas, the black, red and blue toners all block green light to prevent further discharge. After biasing at 400 V and DAD toning with green toner at 400 V in step 7, the surface potential in area (b) initially at 0 V is raised to 400 V.

Thus returning to FIG. 1, at the first development station C, a CAD development system, indicated generally by the reference numeral 64, advances developer materials into contact with the electrostatic latent images. The development system 64 comprises a developer housing. The developer housing 64 contains a pair of magnetic brush rollers 66 and 68. The rollers advance developer material into contact with the photoreceptor for developing the regions above the bias potential. The developer material, by way of example, contains positively charged black toner. The black toner is applied to the latent electrostatic images contained on the photoconductive surface 10 via magnetic brush rollers, the carrier of this two component developer being selected such that the black toner is positively charged through triboelectric charging thereagainst. Electrical biasing is accomplished via power supply, electrically connected to developer apparatus. A suitable DC bias voltage is applied to the rollers 66 and 68 via the power supply.

At second development station D, a DAD development system, indicated generally by the reference numeral 70, advances developer materials into contact with the DAD electrostatic latent images. The development system 70 comprises a first developer housing. The developer housing 70 contains a pair of magnetic brush rollers 72 and 74. The rollers advance developer material into contact with the photoreceptor for developing the regions below the bias potential. The developer material, by way of example, contains negatively charged blue toner. The blue toner is applied to the latent electrostatic images contained on the photoconductive surface 10 via magnetic brush rollers, the carrier of this two component developer being selected such that the blue toner is negatively charged through triboelectric charging thereagainst. Electrical biasing is accomplished via power supply, electrically connected to developer apparatus. A suitable DC bias voltage is applied to the rollers 72 and 74 via the power supply.

Next, a non-imaging uniform exposure of infrared light is applied to the photoconductor with a well controlled light source such as a fluorescent lamp 76 at the first uniform exposure station E. The areas of the photoreceptor that have already been developed with black or blue toner, are shielded from the red light by the deposited toner, so, little or no discharge occurs in these areas. If necessary, the emission spectrum of the lamp could be tuned relative to the absorption spectra of the toners to fully insure that discharge beneath the toners does not take place.

At third development station F, a DAD development system, indicated generally by the reference numeral 78, advances developer materials into contact with the electrostatic latent images. The developer housing 78 contains a pair of magnetic rolls 80 and 82. The rollers advance developer material into contact with the photoreceptor for developing the regions below the bias potential. The developer material, by way of example, contains negatively charged red toner. Appropriate electrical biasing is accomplished via power supply electrically connected to developer apparatus. A suitable DC bias is applied to the rollers 80 and 82 via the bias power supply.

Next, a non-imaging uniform exposure of green light is applied to the photoconductor with a well controlled light source such as a fluorescent lamp 84 at the second uniform exposure station G. The areas of the photoreceptor that have already been developed with black, blue and red toner, are shielded from the light by the deposited toner, so, little or no discharge occurs in these areas. If necessary, the emission spectrum of the lamp could be tuned relative to the absorption spectra of the toners to fully insure that discharge beneath the toners does not take place.

At fourth development station H, a DAD development system, indicated generally by the reference numeral 86, advances developer materials into contact with the electrostatic latent images. The developer housing 86 contains a pair of magnetic rolls 88 and 90. The rollers advance developer material into contact with the photoreceptor for developing the regions below the bias potential. The developer material, by way of example, contains negatively charged green toner. Appropriate electrical biasing is accomplished via power supply electrically connected to developer apparatus. A suitable DC bias is applied to the rollers 88 and 90 via the bias power supply.

Thus the development process produces four colors plus white in the final print. In principle any four colors of toner can be used as long as each color has good absorption of the light in subsequent blanket exposure steps to prevent discharge of the underlying photoreceptor in these regions.

Because the composite image developed on the photoreceptor consists of both positive and negative toner, a typically positive pre-transfer corona discharge member 92, disposed at pre-transfer charging station I, is provided to condition the toner for effective transfer to a substrate using positive corona discharge. The pre-transfer corona discharge member is preferably an AC corona device biased with a DC voltage to operate in a field sensitive mode and to perform xerography pre-transfer charging in a way that selectively adds more charge (or at least comparable charge) to the parts of the image that must have their polarity reversed. This charge discrimination may be enhanced by discharging the photoreceptor carrying the composite developed latent image with light before the pre-transfer charging begins. Furthermore, flooding the photoreceptor with light coincident with the pre-transfer charging minimizes the tendency to overcharge portions of the image which are already at the correct polarity.

A sheet of support material 94 is moved into contact with the toner image at transfer station J. The sheet of support material is advanced to transfer station J by conventional sheet feeding apparatus, not shown. Preferably, the sheet feeding apparatus includes a feed roll contacting the uppermost sheet of a stack copy sheets. Feed rolls rotate to advance the uppermost sheet from the stack into a chute which directs the advancing sheet of support material into contact with photoconductive surface of belt 10 in a timed sequence, so that the developed toner powder image contacts the advancing sheet of support material at transfer station J.

Transfer station J includes a corona generating device 96 which sprays ions of a suitable polarity onto the backside of sheet 94. This attracts the charged toner powder images from the belt 10 to sheet 94. After transfer, the sheet continues to move, in the direction of arrow 98, onto a conveyor (not shown) which advances the sheet to fusing station K.

Fusing station K includes a fuser assembly, indicated generally by the reference numeral 100, which permanently affixes the transferred powder image to sheet 94. Preferably, fuser assembly 100 comprises a heated fuser roller 102 and a backup roller 104. Sheet 94 passes between fuser roller 102 and backup roller 104 with the toner powder image contacting fuser roller 102. In this manner, the toner powder image is permanently affixed to sheet 94. After fusing, a chute, not shown, guides the advancing sheet 94 to a catch tray, also not shown, for subsequent removal from the printing machine by the operator.

After the sheet of support material is separated from photoconductive surface of belt 10, the residual toner particles carried on the photoconductive surface are removed therefrom. These particles are removed at cleaning station L. A magnetic brush cleaner housing is disposed at the cleaner station L. The cleaner apparatus comprises a conventional magnetic brush roll structure for causing carrier particles in the cleaner housing to form a brush-like orientation relative to the roll structure and the charge retentive surface. It also includes a pair of detoning rolls for removing the residual toner from the brush.

Subsequent to cleaning, a discharge lamp (not shown) floods the photoconductive surface with light to dissipate any residual electrostatic charge remaining prior to the charging thereof for the successive imaging cycle.

Four color development with a subtractive color scheme using cyan, magenta, yellow and black (C,M,Y,K) toners is another embodiment. The development scheme must be able to deposit up to two colors of toners in any given pixel. Deposition of three colors, cyan, magenta and yellow (C,M,Y) is replaced by deposition of black (K) toner only. An appropriate combination of toner polarities, development biases and intermediate exposure steps must again be used. In choosing these combinations one must use the fact that identical photoreceptor surface voltages can be achieved by several different combinations of color exposures, as shown in FIG. 6.

Figure 6:
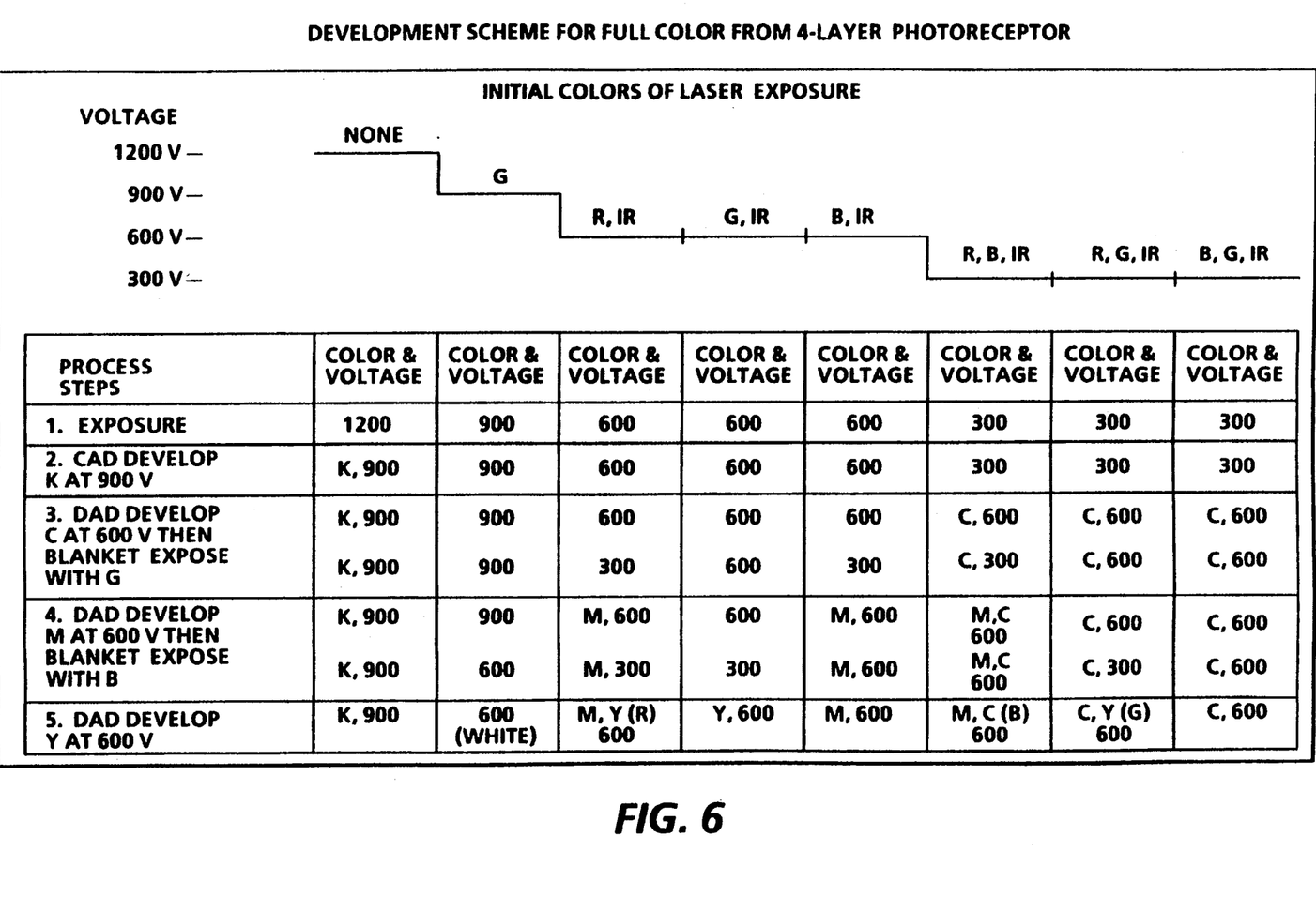
FIG. 6 is a schematic illustration of the development of an alternate embodiment of the multiple layer photoreceptor belt for the xerographic printing system of FIG. 1 formed according to the present invention.

The steps in the four color development process of the second embodiment in FIG. 6 are: first, exposure of the photoreceptor belt to the four modulated laser beams of different wavelengths; second, CAD development of the black at 900 volts; third, DAD development of the cyan at 600 volts, then blanket exposure with green light; fourth, DAD development of the magenta at 600 volts, then blanket exposure with blue light; and fifth, DAD development of the yellow at 600 volts.

CAD development of black (K) toner is done in the first step. Black toner shields those areas which it has covered from the blanket green and blue exposures which are performed in steps 3 and 4. This prevents significant discharge and subsequent development of additional toner layers over the K layer. Those areas initially exposed with green light survive the blanket green light exposure in the third step and survive all subsequent development steps without development of toner and become the white areas. All combinations of one or two colors of toner are covered in the remaining steps of FIG. 6. Therefore full color pictorial imaging is possible with this development scheme.

The xerographic printing system for subtractive primary color toners would be similar to the xerographic printing system for additive primary color toners of FIG. 1. The charging station, the ROS and the exposure station at the beginning of the printing system and the pre-transfer charging station, the transfer station, the fusing station and the cleaning station at the end of the printing system would be the same although the four light beams would be modulated differently to account for the change from additive to subtractive primary colors.

The intervening exposure and development stations of the subtractive primary color printing system would be similar to the ones of the additive primary color printing system. The subtractive primary color printing system, after the exposure station, would have a first CAD development station, a second DAD development station, a first uniform exposure station, a third DAD development station, a second uniform exposure station and a fourth DAD development station. Then, the pre-transfer station would follow.

It is important that each color spot from the multiple laser beams be scanned over the entire photoreceptor so that any desired voltage discharge level (and resulting deposited color toner) can be achieved anywhere on the photoreceptor. Alternatively in either xerographic printing system, the multiple beams of different wavelengths of the laser emitter of the ROS can be aligned perpendicular to the scanning motion along the photoreceptor. Each scan would cover four lines so that it would take four scans for all four spots to cover any given point on the photoreceptor.

As mentioned previously, this multiple wavelength laser source ROS system could be enhanced by use of multispot sources for each of the colors which would result in increased addressability/throughput. The four color spots can be aligned parallel to the scanning motion along the photoreceptor with the same color spot also be aligned four deep perpendicular to the scanning motion along the photoreceptor. All four color spots would be scanned over a given point on the photoreceptor on each of four consecutive scans for a total of 16 spots imaged on the photoreceptor simultaneously.

The use of a dual beam light source with the two emitted beams sharing the same optical elements in the raster output scanner optical system provides improved pixel placement accuracy upon the photoreceptor belt since a common polygon facet is used. Sharing the optical elements also reduces the physical size, the number of optical elements and the costs of the ROS. However, the sharing of optical elements by the dual beams is merely an illustrative example of the xerographic printing system. Each beam could have a separate ROS optical system or just share certain ROS optical elements, like the facet of the rotating polygon mirror.

Figure 7:
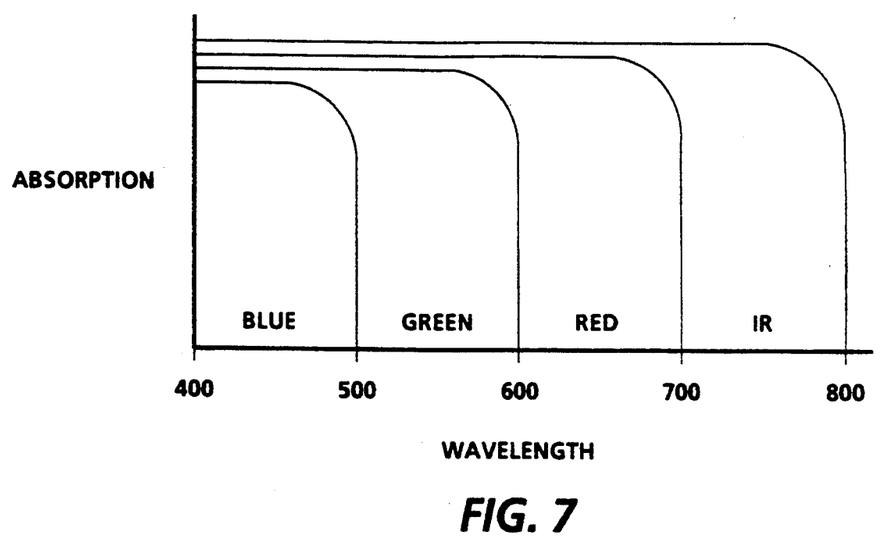
FIG. 7 is a schematic illustration of the wavelength sensitivity of a multiple layer photoreceptor belt versus the wavelength range of the multiple wavelength laser structure of an alternate embodiment of the multiple layer photoreceptor belt.

An alternate embodiment of the photoreceptor belt could have the generator layers sensitive to more than one color or sensitive over a wider range of wavelength. As shown in FIG. 7, one photoconducting layer would be sensitive to just blue, another photoconducting layer would be sensitive to blue and green, another photoconducting layer would be sensitive to blue, green, and red, and the last photoconducting layer would be sensitive to blue, green, red and infrared.

Figure 8:
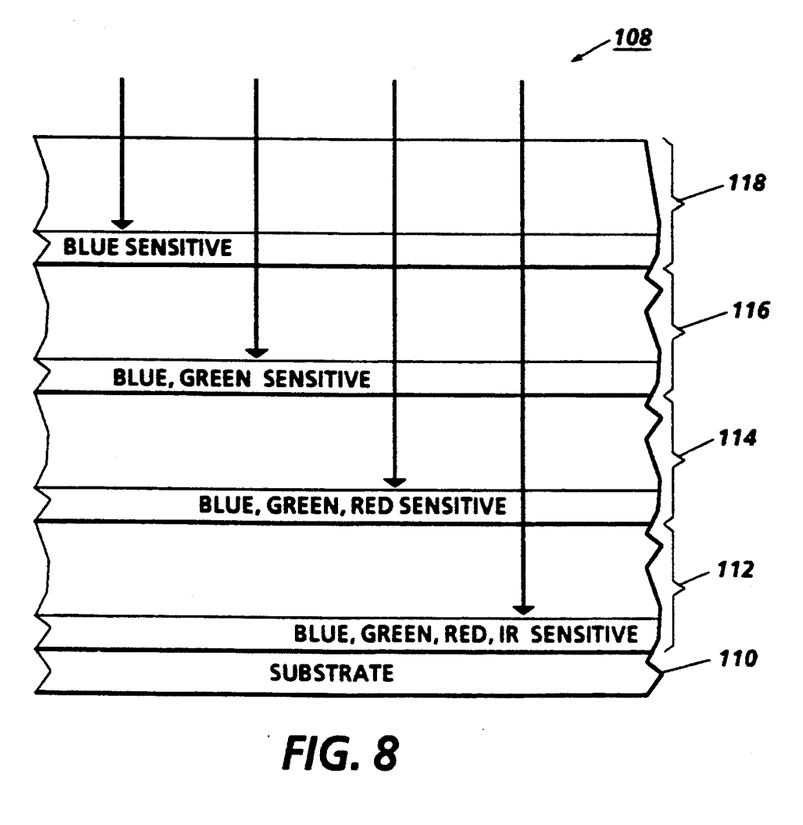
FIG. 8 is a schematic illustration of the cross-section side view of the exposure of the multiple layer photoreceptor belt of FIG. 7 formed according to the present invention.

The photoreceptor 108 as seen in FIG. 8 would have the conductive substrate 110 upon which is the first or lower photoconducting layer 112 sensitive to blue, green, red and infrared, then the second or lower middle photoconducting layer 114 sensitive to blue, green, and red, then the third or upper middle photoconducting layer 116 sensitive to blue and green, then the fourth or upper photoconducting layer 118 sensitive to just blue.

These layers are stacked such that the broadest sensitivity (IR sensitive) layer is at the bottom of the photoreceptor, the next broadest is on top of this and so on to the top where the narrowest sensitivity (blue sensitive) layer is situated. Light of a given color is accessible to only one of the photoreceptor layers. Blue light is absorbed in the top layer and cannot reach any of the lower layers which could also be sensitive to it. Green light passes through the blue sensitive layer and is absorbed in the second layer and prevented from reaching layers below which could also be sensitive to it. This pattern continues so that each wavelength is absorbed by only one photoreceptor layer.

The substrate of the photoreceptor belt can be opaque, translucent, semitransparent, or transparent, and can be of any suitable conductive material, including copper, brass, nickel, zinc, chromium, stainless steel, conductive plastics and rubbers, aluminum, semitransparent aluminum, steel, cadmium, silver, gold, paper rendered conductive by the inclusion of a suitable material therein or through conditioning in a humid atmosphere to ensure the presence of sufficient water content to render the material conductive, indium, tin, metal oxides, including tin oxide and indium tin oxide, and the like. In addition, the substrate can comprise an insulative layer with a conductive coating, such as vacuum-deposited metallized plastic, such as titanized or aluminized Mylar ® polyester, wherein the metallized surface is in contact with the bottom photoreceptor layer or any other layer situated between the substrate and the bottom photoreceptor layer.

In this embodiment, examples of suitable red light sensitive pigments include perylene pigments such as dibromoanthranthrone, crystalline trigonal selenium, beta-metal free phthalocyanine, azo pigments, benzimidazole perylene (BZP), and the like, as well as mixtures thereof. Examples of suitable infrared sensitive pigments include X-metal free phthalocyanine, metal phthalocyanines such as vanadyl phthalocyanine, chloroindium phthalocyanine, chloroaluminum phthalocyanine, copper phthalocyanine, magnesium phthalocyanine, and the like, titanyl phthalocyanine (TiOPc), squaraines, such as hydroxy squaraine, and the like as well as mixtures thereof. Examples of blue sensitive material are amorphous selenium, methylene blue anthracene and sulphur. Examples of green sensitive material are quinacridene, Se-Te alloys and pigments such as Pigment Red 122 (C173915). Examples of suitable charge transport materials include diamine molecules, pyrazoline molecules, substituted fluorene molecules, oxadiazole molecules, hydrazone molecules, carbazole phenyl hydrazone molecules, vinylaromatic polymers, oxadiazole derivatives, tri-substituted methanes, and 9-fluorenylidene methane derivatives.

The photogenerator's material usable in the multilayered photoreceptor structure needed can be greatly expanded by considering not only materials with narrow, well-defined, absorption bands as shown in FIG. 4 but by also considering materials with wider absorption bands. The requirement is that each color of laser light discharges only one layer of the photoreceptor. This occurs if each layer is only accessed by one color of laser light which is achieved if each wavelength is absorbed in a given layer which prevents this light from reaching lower layers which may also be sensitive to that particular wavelength. This general concept is illustrated in FIGS. 7 and 8. Combinations of the absorption schemes used in FIGS. 4 and 7 may also be used. For example, the blue, red and IR sensitive layers would have wide absorption bands similar to those in FIG. 7 and the green sensitive layer could have a narrow absorption band as shown in FIG. 4. The stacking order of the layers in FIG. 8 is important since each wavelength of laser light must be stopped in the layer where it is first absorbed and be prevented from reaching lower layers which are also sensitive to it. If each layer is of the narrow absorption band type as shown in FIG. 4, then the order of the layer stacking does not matter.

It should be noted that in each of the embodiments described each voltage level has been referred to as a single number. In actual practice, certain ranges about the given values will occur and the process latitudes must encompass these ranges. Discrete regularly spaced voltage values have been referred to in order to simplify the discussions.

Similarly, the wavelengths used in the embodiments are merely illustrative examples. In actual practice, certain wavelength ranges can be used and each wavelength is not restricted to a single color. The only criteria is that the wavelengths be sufficiently separated so that any given wavelengths access only one of the photoreceptor layers.

Since the printing technique disclosed herein uses only one imager it offers complete extensibility of system architecture over an entire product line. A low end black and white printer would use a single spot laser diode with a conventional photoreceptor and conventional hi-level xerographic development. Black and white printers of increasing quality/throughput would use dual spot or quad spot laser diodes of a single wavelength, the same single polygon, single optics ROS and a conventional photoreceptor with conventional two level xerographic development. In three color highlight color printers the single polygon, single optics ROS would remain; the single wavelength laser source would be replaced with a dual wavelength laser source and the conventional photoreceptor would be replaced with a two color photoreceptor. Conventional two level xerographic development would be replaced with three level development and three colors would be possible. In four SPOT color printing (red, green, blue and black) a three wavelength laser diode light source would propogate through the same single polygon, single optics ROS. A three color photoreceptor would be used with four level xerographic development. In process color printing (cyan, magenta, yellow, and black) a four wavelength laser diode light source would propogate through the same single polygon, single optics ROS. A four color photoreceptor would be used with multi-level xerographic development. In the case of four color printing with very high quality/throughput the single emitters of each wavelength of the laser light source would be replaced with a dual spot (total of 8 spots) or quad spot (total of 16 spots). Therefor, a common system architecture could be used through an entire product family from low end black and white printing through high volume production color printing.

The photoreceptor belt of the present invention can, in the alternative, be a drum photoreceptor or other equivalents.

As will be appreciated by those skilled in the art, while conductive magnetic brush development has been disclosed in order to take advantage of its inherent charge neutralization properties, scavengeless or noninteractive development may be employed.

While the invention has been described in conjunction with specific embodiments, it is evident to those skilled in the art that many alternatives, modifications and variations will be apparent in light of the foregoing description. Accordingly, the invention is intended to embrace all such alternatives, modifications and variations as fall within the spirit and scope of the appended claims.

What is claimed is:

1. A xerographic printing system comprising:
   a raster output scanner optical system for generating a plurality of modulated beams at a plurality of wavelengths, each of said modulated beams having a different wavelength,
   a photoreceptor means having a plurality of layers, each layer being sensitive or accessible only to one of said plurality of wavelengths, and
   xerographic means for charging said photoreceptor means, said xerographic means then exposing areas of said photoreceptor means to said plurality of modulated beams, either singularly or in combination, and, after exposure, said xerographic means depositing at least a plurality of toners on said photoreceptor means in response to exposure of said areas of said layers to said modulated beams.

2. The xerographic printing system of claim 1 wherein said photoreceptor means comprises a photoreceptor belt, said photoreceptor belt having said plurality of layers upon an electrically conductive substrate.

3. The xerographic printing system of claim 1 wherein said raster output scanner optical system comprises a single rotating polygon and single optical system for said plurality of modulated beams.

4. The xerographic printing system of claim 1 wherein the light source of said raster output scanner optical system comprises a semiconductor laser for emitting said plurality of modulated beams at a plurality of wavelengths.

5. The xerographic printing system of claim 1 wherein said photoreceptor means has four layers and each of said four layers is sensitive to only one of said plurality of wavelengths.

6. The xerographic printing system of claim 1 wherein said photoreceptor means has four layers and each of said four layers may be sensitive to more than one of said plurality of wavelengths but each of said four layers is accessible to only one of said wavelengths said layer is sensitive to.

7. The xerographic printing system of claim 1 wherein said raster output scanner optical system generates four modulated beams at four different wavelengths, and said photoreceptor means has four layers.

8. The xerographic printing system of claim 7 wherein each of said four layers is sensitive to only one of said plurality of wavelengths.

9. The xerographic printing system of claim 7 wherein each of said four layers may be sensitive to more than one of said plurality of wavelengths but each of said four layers is accessible to only one of said wavelengths said layer is sensitive to.

10. The xerographic printing system of claim 1 wherein blanket exposure steps are used between toner development stations to selectively change voltage levels in certain areas of said photoreceptor which were exposed to at least one of said plurality of modulated beams to allow subsequent toner development in only one of said areas.

11. The xerographic printing system of claim 1 wherein the light source of said plurality of layers are sensitive to or accessible to wavelengths in the infrared, red, green and blue.

12. The xerographic printing system of claim 1 wherein said photoreceptor means comprises a photoreceptor drum, said photoreceptor drum having an electrically conductive substrate upon which is said plurality of layers.

* * * * *